United States Patent [19]

Munoz Saiz

[11] Patent Number: 4,564,312

[45] Date of Patent: Jan. 14, 1986

[54] SYSTEM FOR UTILIZING THE ENERGY OF WAVES

[76] Inventor: Manuel Muñoz Saiz, San Emilio, 16, Madrid, Spain

[21] Appl. No.: 500,630

[22] Filed: Jun. 3, 1983

[30] Foreign Application Priority Data

Dec. 14, 1982 [ES] Spain ................................. 518.197

[51] Int. Cl.[4] .............................................. E02B 9/08
[52] U.S. Cl. ........................................ 405/76; 405/31
[58] Field of Search ...................... 405/31, 75, 76, 77, 405/78; 290/42, 53

[56] References Cited

U.S. PATENT DOCUMENTS

| Re. 11,807 | 1/1900 | Rogowski | 405/77 |
| 1,294,808 | 2/1919 | Jenkins | 405/76 |
| 2,410,430 | 11/1946 | Danel | 405/76 |
| 2,641,108 | 6/1953 | Montgomery et al. | 405/76 |

Primary Examiner—David H. Corbin
Attorney, Agent, or Firm—Ostrolenk, Faber, Gerb & Soffen

[57] ABSTRACT

A system for utilizing the energy of waves in the ocean, comprising a wall having a plurality of compartments separated by vertical and horizontal partitions. The water of a wave covers the entrance of a compartment and then enters the compartment, and the wave advance forces the air in that compartment through a conduit, past a non-return valve and into a storage tank, from which the compressed air may then be supplied to a turbine, or the like. The partitions between compartments assure that while the entrance to one compartment may be covered with water, whereby the air therein is forced to the storage tank, the air does not escape through other compartments which are not then covered.

8 Claims, 4 Drawing Figures

SYSTEM FOR UTILIZING THE ENERGY OF WAVES

BACKGROUND AND SUMMARY OF THE INVENTION

The present invention relates to a system for utilizing the energy of waves.

Various systems are known for utilizing the energy of waves of the ocean, seas, or the like.

The present invention utilizes the principle of a wave entering a compartment, forcing the air in that compartment into storage means and preventing the return flow of the air as the water returns or runs out, and the stored compressed air is then released to drive a turbine, or the like. The entrance into the system comprises a series of compartments, each surrounded by horizontal and vertical partitions or shelves, whereby a wave may cover over the entrances of and enter some of the compartments, without entering the others, and the air in the compartments whose entrances are completely covered by the waves as the water enters is forced out, without the air simply exiting through other compartments at the entrance where waves are not then present.

The system of the invention has a number of advantages.

1. It makes it possible to utilize both the frontal impact of the wave as it advances and the ascending effect which it produces on the surface of the water.

2. It can operate at different levels of the tide.

3. The energy of the waves is utilized to compress air, which can be used for any purpose such as driving turbines to produce electricity, driving pneumatic motors, supplying compressed air systems of industrial installations, etc.

4. The supply of energy is practically constant since the surge of the waves never completely ceases.

5. By combining several units, very high powers can be obtained.

6. No moving parts are required so that the life of the installation is practically unlimited.

The system of the present invention uses plates which are located above the water when the water is calm and which form an acute angle with its surface and with the adjacent wall of the coast or a retaining wall. Upon the arrival of the wave, the air contained below the plate is compressed and forced to pass to a storage tank from which the compressed air will be distributed in regulated fashion.

The drawings accompanying this text show a few possible practical embodiments of the system, by way of example.

DESCRIPTION OF THE PREFERRED EMBODIMENTS

Figure 1:
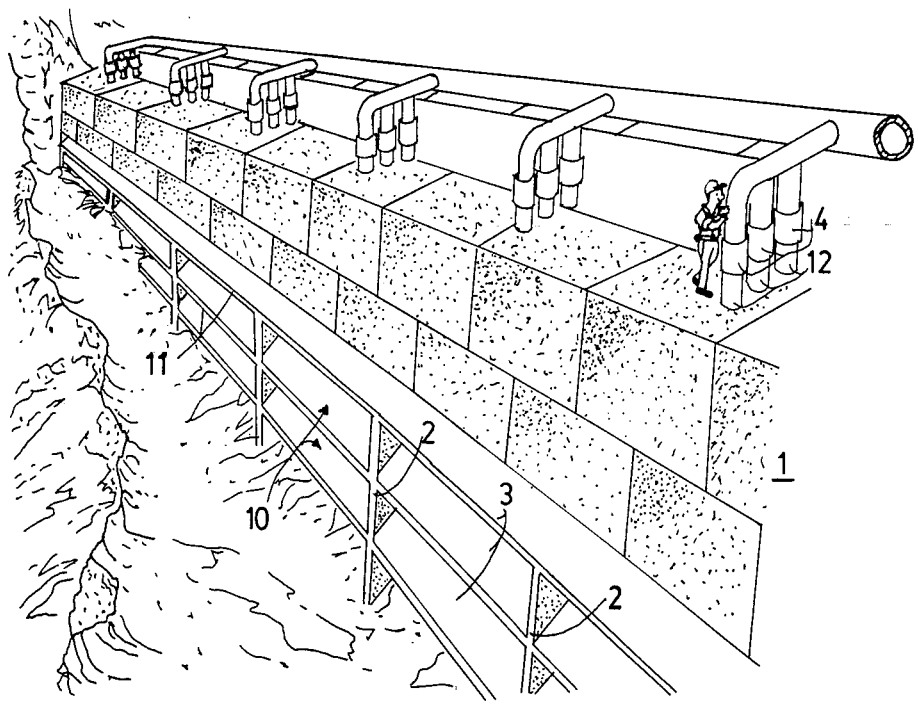
FIG. 1 is a perspective view of an installation which incorporates the system of the present invention applied to a vertical wall.

The system for utilizing the energy of the waves includes a cavity 10 inside a wall. The waves enter through the entrance or mouth 11 of the cavity, filling it completely with water and driving the air contained therein out through a conduit 12, which is provided with a non-return valve 4. The air is thus compressed and is forced to a storage tank 5.

In FIG. 1, the system is on a vertical wall 1 which is divided along its horizontal width into a plurality of compartments by means of vertical separating walls or partitions 2. This wall arrangement assures that there is no loss of the effect of the wave when it strikes with a certain inclination, as can be noted in FIG. 1. For better results, the walls 2 may be inclined to generally parallel the usual direction at which the waves strike the walls, i.e. perpendicular to the waves. At the same time, there is a further vertical division of the separate compartments by the horizontal, upwardly inclined plates 3 at and also above the water level in order to permit the capture of the energy from the waves, regardless of the height of the water as a function of the tide present at the time. The incline of the walls or plates 3 dissipates the waves as they roll into the compartments. Each compartment has a valve 4 which prevents the air from moving back during the descent or return of the water from a wave.

Figure 2:
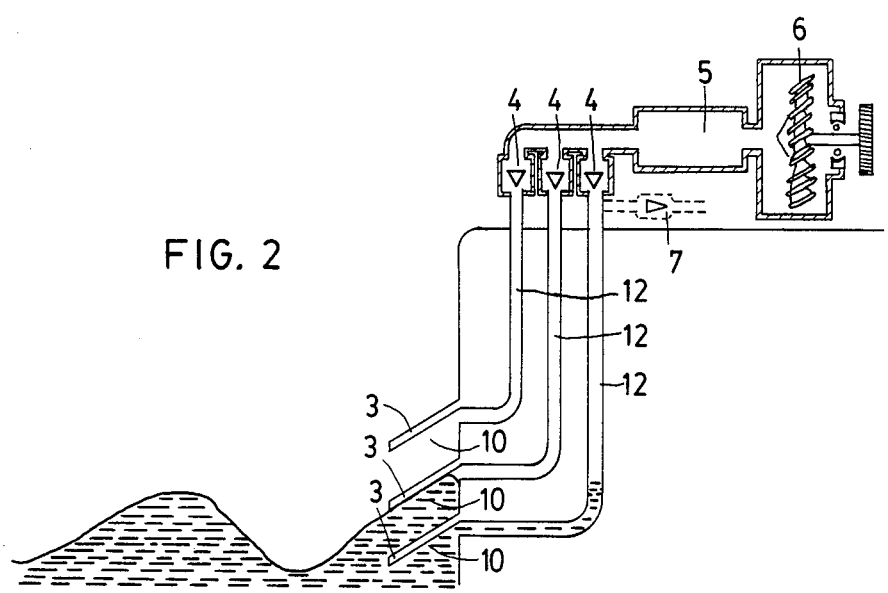
FIGS. 2, 3 and 4 diagrammatically show the system in vertical section as applied to a vertical wall, a rock wall and irregular coastal terrain, respectively.

FIG. 2 diagrammatically shows the above system showing the storage tank 5 for the air compressed by the waves. The air is stored for subsequent action on a turbine 6.

The valve 7 permits return of air into the conduits 12, e.g. air from the outside. This valve is optional and permits or assists the water to descend more easily.

Figure 3:
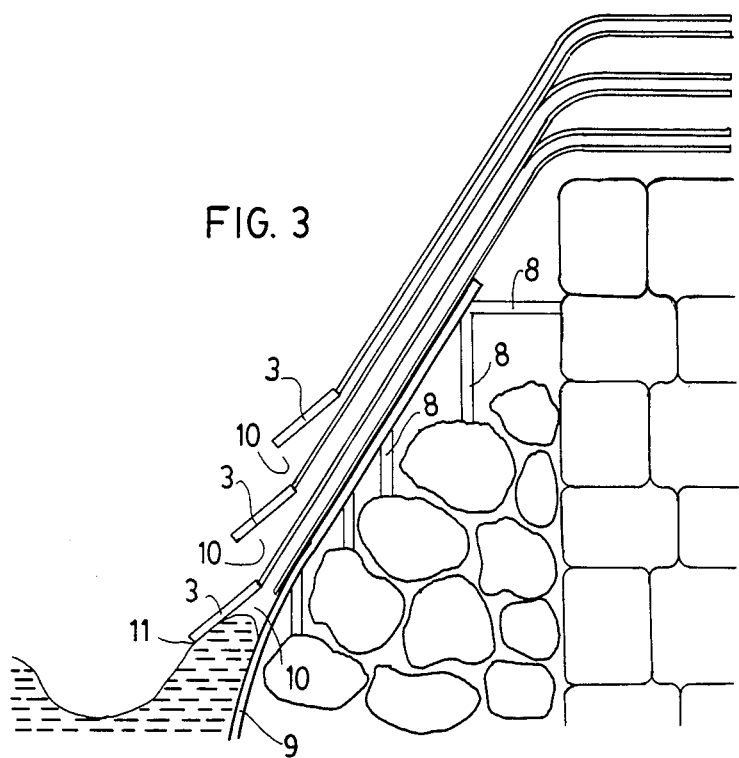

In FIG. 3 the same system is shown diagrammatically, with a special arrangement mounted on a coastal wall of rock. There are added rock securing supports 8 and a plate 9 which adapts the system to irregularities of the terrain. The lower portion of the plate 9 serves as a guide and return for the water.

Figure 4:
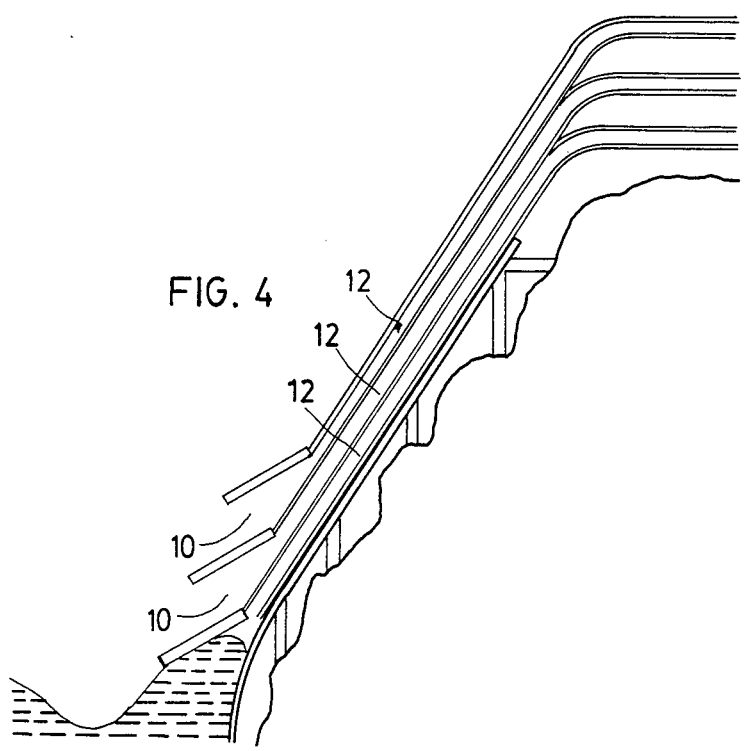

FIG. 4 shows an arrangement adapted to irregular coastal terrain and also includes the adaptation plate 9.

The system may be constructed on the coast, on harbor sea walls, other walls, etc., whether the system was intended originally for other purposes or specially constructed to house the installation. The system can furthermore be developed in different structural forms and of suitable materials, being capable of change and modification of detail provided that they do not alter its essential characteristics.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. A system for utilizing the energy of waves of a body of water comprising a wall, or the like, against which the waves advance, the system comprising a cavity in the wall, or the like, the cavity having an inlet side facing toward the waves and the inlet side of the cavity being shaped and defined such that it may be closed off by the wave water; an air transmitting conduit means connected at the other side of the cavity, and positioned such that the water entering the cavity from the advancing waves driving air from the cavity through the conduit means; a storage tank communicating with the conduit means for receiving the air pushed by the waves and a non-return valve in the conduit means for preventing return of air pushed into the tank by the advancing waves; air driven apparatus; means for directing air from said tank to said air driven apparatus to operate the same.

2. The system of claim 1, further comprising a plurality of horizontally spaced apart, vertically oriented partitions for dividing the cavity into a series of separate compartments, such that a wave closing off the inlet to the cavity between two of the partitions may force the air through the conduit, although the wave does not cover the inlet to the cavity between two other partitions simultaneously.

3. The system of claim 2, wherein the vertical partitions are oriented generally perpendicular to the predominant direction of advance of the waves against the inlet.

4. The system of claim 3, further comprising a plurality of vertically spaced apart, horizontally oriented partitions and intersecting the horizonally spaced apart vertical partitions, for defining a vertical stack of compartments, whereby the lower compartments may be covered by shorter waves or waves at lower tide while the higher compartments would be covered along with the lower compartments by higher waves or waves at higher tide, and each of the compartments defined by the horizontal and vertical partitions being separately connected with the conduit, whereby air pushed from one compartment and into the conduit means does not escape through another compartment.

5. The system of claim 1, further comprising a plurality of vertically spaced apart horizontal partitions in the inlet for defining compartments of different height over the wall, whereby waves of smaller height or at lower tide, whereby the lower compartments may be covered by shorter waves or waves at lower tide while the higher compartments would be covered along with the lower compartments by higher waves or waves at higher tide, and each of the compartments defined by the horizontal and vertical partitions being separately connected with the conduit, whereby air pushed from one compartment and into the conduit means does not escape through another compartment.

6. The system of claim 1, wherein the wall comprises a wall constructed for intersecting advancing waves.

7. The system of claim 1, wherein the wall comprises a breakwater at the coast against which the waves advance.

8. The system of claim 1, further comprising an air return valve communicating into the conduit means for permitting return of air into the conduit means as the waves retreat, and the air return valve communicating with air outside the storage tank and conduit.

* * * * *